US007165778B2

(12) United States Patent
Kuiken

(10) Patent No.: US 7,165,778 B2
(45) Date of Patent: Jan. 23, 2007

(54) MANUALLY OPERABLE STANDING WHEELCHAIR

(75) Inventor: Todd A. Kuiken, Oak Park, IL (US)

(73) Assignee: Rehabilitation Institute of Chicago, Chicago, IL (US)

( * ) Notice: Subject to any disclaimer, the term of this patent is extended or adjusted under 35 U.S.C. 154(b) by 0 days.

(21) Appl. No.: 11/267,989

(22) Filed: Nov. 7, 2005

(65) Prior Publication Data

US 2006/0061067 A1 Mar. 23, 2006

Related U.S. Application Data

(63) Continuation of application No. 10/422,594, filed on Apr. 24, 2003, now Pat. No. 6,976,698.

(51) Int. Cl.
*B62M 1/14* (2006.01)

(52) U.S. Cl. ................................ 280/250.1; 280/304.1

(58) Field of Classification Search ................ 280/647, 280/250.1, 304.1, 5.28, 244, 246, 252, 254, 280/258; 297/320, 344.12, 34.19

See application file for complete search history.

(56) References Cited

U.S. PATENT DOCUMENTS

| | | | | |
|---|---|---|---|---|
| 531,330 | A | 12/1894 | Potter | |
| 3,189,368 | A | 6/1965 | Petersen | |
| 3,640,566 | A | 2/1972 | Hodge | |
| 3,869,146 | A * | 3/1975 | Bulmer | 280/250.1 |
| 4,231,614 | A | 11/1980 | Shaffer | |
| 4,354,691 | A | 10/1982 | Saunders et al. | |
| 4,455,029 | A | 6/1984 | Taylor | |
| 4,545,616 | A | 10/1985 | Booth | |
| 4,569,556 | A | 2/1986 | Pillot | |
| 4,598,944 | A | 7/1986 | Meyer et al. | |
| 5,094,508 | A | 3/1992 | Bathrick et al. | |
| 5,108,202 | A | 4/1992 | Smith | |
| 5,137,295 | A | 8/1992 | Peek | |
| 5,181,733 | A | 1/1993 | Tague | |
| 5,219,204 | A | 6/1993 | Bathrick et al. | |
| 5,401,044 | A * | 3/1995 | Galumbeck | 280/250.1 |
| 5,609,348 | A | 3/1997 | Galumbeck | |
| 5,772,226 | A | 6/1998 | Bobichon | |
| 6,007,082 | A | 12/1999 | Watwood et al. | |
| 6,047,979 | A | 4/2000 | Kraft et al. | |
| 6,250,717 | B1 | 6/2001 | Porcheron | |
| 6,619,681 | B2 * | 9/2003 | Gutierrez | 280/250.1 |
| 6,976,698 | B2 * | 12/2005 | Kuiken | 280/647 |

* cited by examiner

*Primary Examiner*—Hau Phan
(74) *Attorney, Agent, or Firm*—Gardner Carton & Douglas LLP

(57) ABSTRACT

A manually operable standing wheelchair includes an actuator for moving an occupant from a sitting position to a standing position. The manually operable standing wheelchair has a lifting mechanism including a ratchet, cable, pulley, and telescopic tubes, which the occupant may manually operate to shift from the sitting position to the standing position. There is also a drive system to enable the occupant to manually move himself or herself in and the wheelchair from the sitting position to the standing position, or in any position in between. The drive system may include adjustable lever drive arms with friction pads adapted for allowing the occupant to move in any position. The wheelchair is equipped with a set of spring loaded anti-tip wheels that automatically deploy when the manual wheelchair begins to lift from the sitting position to the standing position.

14 Claims, 7 Drawing Sheets

MANUALLY OPERABLE STANDING WHEELCHAIR

CROSS-REFERENCE TO RELATED PATENT APPLICATIONS

This patent application is a continuation of U.S. patent application Ser. No. 10/422,594, filed Apr. 24, 2003, now U.S. Pat. No. 6,976,698 which is incorporated herein by reference in its entirety.

FIELD OF THE INVENTION

This invention pertains to manually operable mechanical devices for moving a person. Specially, the invention pertains to a wheelchair that allows an occupant to adjust the wheelchair from a sitting position to a standing position, and to manually move around.

BACKGROUND OF THE INVENTION

An image of a chair with wheels is inscribed into a sarcophagus in China, with the date of the inscription estimated to be around the sixth century, A.D. Wheelchairs did not become common, however, until the late 19th century.

U.S. Pat. No. 531,330 to Sarah A. Potter ("the Potter patent") shows an example of an early patent for the modern wheelchair. The wheelchair provides a seat back, seat bottom, and footrest. An occupant may rest in the wheelchair in a sitting position. The seat back, seat bottom and footrest are part of a mechanical frame for the wheelchair. Also attached to the frame are two sets of wheels, one smaller set in front ("the front wheels"), and one larger set in the rear, mounted to a rear axle ("the drive wheels"). Attached to the outer rim of the drive wheels is a grip, with which an occupant of the wheelchair may manually rotate the drive wheels and move the chair. The wheelchair shown in the Potter patent also allows for the seat back to be lowered and the footrest to be raised so that the occupant may rest in a reclining position. The modern wheelchair, as shown by way of example in the Potter patent, is simple and useful, allowing an occupant to manually move around while in a sitting position.

One disadvantage to the design of the wheelchair shown in the Potter patent is that the occupant of the wheelchair is confined to the sitting (or reclining) position. For some wheelchair occupants, for example, double amputees, this does not represent a disadvantage. But for many wheelchair users, such as paraplegics, it is desirable for the wheelchair to allow its occupant to be in either a sitting position or a standing position. Among the many desirable advantages of a wheelchair that allows for its occupant to be in a standing position, there are the ability to use conventional counter tops and common appliances designed for use in a standing position, and the ability to reach items high up in a kitchen cabinet or on a grocery store shelf. There are also physiological advantages to allowing the occupant to be in a standing position. Standing can help reduce the risk of developing osteoporosis, tone the cardiovascular system, reduce muscle spasticity, prevent contractures, improve renal function, and relieve pressure from sensitive areas, preventing pressure sores. Finally, and perhaps most importantly, a wheelchair that allows for its occupant to be in a standing position can be of great psychological advantage. It affords its occupant an escape from being literally looked down upon. From a standing position, the occupant may look at other people eye to eye instead.

Attempts have been made to develop a standing wheelchair. U.S. Pat. No. 3,640,566 to Hodge ("the Hodge patent") shows a spring loaded wheelchair that assists a disabled person in moving from a sitting position to a standing position. The wheelchair of the Hodge patent cannot, however, be moved around while an occupant is in the standing position. The foot rest 22 shown in FIGS. 1–6 of the Hodge patent lowers to the ground when the wheelchair shifts from a sitting position to a standing position, preventing the chair from being moved at all while in the standing position.

U.S. Pat. No. 4,569,556 to Bernard Pillot ("the Pillot patent") teaches a wheelchair that allows for an occupant to be raised from a sitting to a near standing position (called the "pseudo-vertical position" in the Pillot patent) by "an articulated structure" of two "deformable quadrilaterals" and an "elastic member", which appears from the drawings to be a gas spring, or some other kind of hydraulic device. The wheelchair of the Pillot patent allows for an occupant to be moved in the standing position (as the wheelchair of the Hodge patent does not), but it does not allow an occupant to move around under his or her own power, i.e., the wheelchair of the Pillot patent cannot be moved by the occupant while the occupant is in the standing position. Thus, without the help of another, the wheelchair of the Pillot patent does not grant an occupant more mobility than the wheelchair of the Hodge patent. Furthermore, as in the Hodge patent, the wheelchair of the Pillot patent does not allow the occupant to lift himself or herself into the standing position. The energy for moving from the sitting position to the standing position is provided by the "elastic member", labeled 38 in FIGS. 1–3. Should the "elastic member" break or malfunction, the occupant would be forced to remain in the sitting position.

The wheelchairs of the Hodge patent and the Pillot patent have been further developed by other inventors in various ways. For examples of wheelchairs similar to that of the Hodge patent, see U.S. Pat. Nos. 4,231,614 and 4,598,944, which show wheelchairs that allow an occupant to move to a standing position, and remain stationary in the standing position. For examples of wheelchairs similar to that of the Pillot patent, see U.S. Pat. Nos. 5,609,348 and 5,772,226, which show wheelchairs that assist an occupant in moving from a sitting position to a standing position with a hydraulic device. The invention of U.S. Pat. No. 5,772,226 allows an occupant to move while in the standing position with the assistance of a electricity source (labeled "12" in FIG. 1) and a motor (labeled "11" in FIG. 1).

A need exists for a manually operable wheelchair that allows for an occupant to move himself or herself from a sitting position to a standing position, and to move around manually while in the standing position.

SUMMARY OF THE INVENTION

The present invention provides a wheelchair having an adjustable frame capable of being shifted by an occupant from a sitting position to a standing position, and of being moved by an occupant while in the sitting position, the standing position, or anywhere in between.

The standing operation is based on a support linkage system and telescoping tubes. The support system includes a chair back section with a pair of chair back tubes, which are hingably connected to a seat support linkage. The seat support linkage, in turn, is hingably connected to a leg rest. In moving from a sitting position to a standing position, the pair of chair back tubes telescope up a pair of generally vertical tubes included with a base portion for the wheelchair, and the chair back is thereby lifted. As the chair back is lifted, the seat support linkage is pulled up and back. The end result is that the occupant is lifted up and back into a standing position in the middle of the base portion for the wheelchair. The occupant is secured to the standing wheelchair at the knees and above the waist to prevent falling out of the chair while standing and to maintain correct posture in the standing position.

The telescopic lifting mechanism includes a plurality of tubes and a pulley and cable system on each side of the chair. An occupant presses down on ratcheted lever arms at each side of the chair, which shorten the cable, tuning the pulley and cranking up the chair back. The occupant is lifted up and back into the middle of the base portion for the wheelchair. The chair back tubes, seat support linkages, and leg rest are all mechanically linked by a leg support linkage in order to prevent the leg rest from swinging freely. The amount of force required to operate the lift is directly proportional to the speed of lifting. A comfortable lifting force or speed may be customized for each user by adjusting the pulley size. For most people, standing can be performed in 4–8 strokes and 15–20 seconds. Moving from standing to sitting requires only a release of the pulley system in a controlled fashion, allowing gravity to pull the chair back into the sitting position. Alternate lifting mechanisms, (for example, a rack and pinion), may also be used, as will be recognized by those of skill in the art.

In an embodiment of the present invention, as soon as the seat is lifted a few inches, a spring-loaded mechanism deploys a pair of anti-tip wheels. The anti-tips wheels extend the wheelbase of the wheelchair, providing a more stable platform for safe operation of the wheelchair on smooth, level surfaces. With the pair of anti-tip wheels deployed, the wheelchair has six wheels in contact with the ground: a pair of drive wheels, a pair of front wheels, and the pair of anti-tip wheels. Advantageously, this plurality of wheels prevents the operation of the wheelchair on inclines or rough terrain, where the wheelchair may be dangerous for use by an occupant.

When the chair back is fully raised, the occupant is pulled up and back within the wheelbase, and between a pair of generally horizontal tubes included with the base portion into an erect, standing position. The lever arms, which also serve as armrests, can be rotated out of the way. Because of the high center of gravity, it is not prudent to move the wheelchair in the standing position on inclined or rough surfaces. However, remaining stationary in the standing position on a rough surface can be done safely.

In an embodiment, it is necessary to use a lever drive system for moving the wheelchair, since the occupant may not be able to reach the pair of drive wheels while in the standing position. Lever drive systems have the advantage of greater ergonomic efficiency. The lever drive system includes a pair of lever drive arms that pivot about a pair of rear drive wheels, each of the pair of lever drive arms having friction pads mounted at the lever of the tires. Pressing the friction pads into the tires of the pair of drive wheels and stroking with a rowing-type motion effectively rotates the pair of drive wheels, moving the wheelchair. The length of the pair of lever arms is adjustable so that the wheelchair is conveniently and efficiently movable from both the sitting position and the standing position.

In an embodiment, the present invention provides an adjustable frame for a wheelchair comprising a base portion, at least one chair back tube, and at least one support linkage. The base portion includes a plurality of wheels, at least one generally horizontal tube, and at least one generally vertical tube. The chair back tubes are slidably mounted to the generally vertical tubes, so that the chair back tubes are vertically slidable from a lower position to a higher position. The support linkages are hingably connected to the chair back tubes and slidably contact some of the generally horizontal tubes. As the chair back tubes move from the lower position to the higher position, the support linkages moves from a generally horizontal position to a generally vertical position.

In another embodiment, the base portion includes a pair of drive wheels and at least one front wheel. Generally, the pair of drive wheels and the front wheels include a pair of "left and right drive wheels" and a pair of "left and right front wheels", respectively. As will be recognized by those of skill in the art, however, the pair of front wheels may, in some embodiments, be replaced by a single front wheel. The use of drive wheels and front wheels with a wheelchair is known, and the invention should be understood to include a plurality of embodiments having a variety of front wheel and drive wheel configurations.

In another embodiment of the present invention, the base portion for the wheelchair includes at least one retractable anti-tip wheel. The anti-tip wheels may be spring-loaded in some embodiments of the present invention, so that the anti-tip wheels deploy when the adjustable frame for the standing wheelchair is lifted from the sitting position. The anti-tip wheels are retracted in the sitting position.

In yet another embodiment of the present invention, the base portion of the adjustable frame for the wheelchair includes a pair of generally vertical tubes, with the pair of chair back tubes slidably mounted to the pair of generally vertical tubes so that the generally vertical tubes telescope out of the pair of chair back tubes as the pair of chair back tubes are lifted to the higher position. As will be recognized by those of skill in the art, the pair of generally vertical tubes does not need to telescope into the pair of chair back tubes for the chair back tubes to move from the lower position to the higher position. The pair of chair back tubes might be lifted along the pair of generally vertical tubes using an equivalent mechanism, such as a selectively engaged rail or track. The present invention should be understood to include a plurality of different mechanisms for lifting the pair of chair back tubes with respect to the base portion of the adjustable frame.

In still another embodiment of the present invention, the support linkages include a seat support linkage and a leg support linkage operably linked to the seat support linkage. Optionally, the operable link between the seat support linkage and the leg support linkage may be provided by a leg rest hingably connected to both. However, other operable links are possible, as will be appreciated by those of skill in the art.

In embodiments that include the seat support linkage, an end of the seat support linkage opposite a hinged connection between the seat support linkage and the at least one chair back tube is in slidable contact with at least one generally horizontal tube of the base frame portion. The slidable contact provides a mechanical support to the weight of an occupant of the wheelchair in the sitting position, or in a position intermediate between the sitting position and the standing position. (In the standing position, most of the weight of the occupant will be transferred to the legs and feet of the occupant.)

In embodiments of the present invention in which the support linkages include a leg rest, a foot rest may also optionally be included. The foot rest is fixed to the leg rest at a point vertically below where the leg rest is hingably connected to the leg support linkage.

In yet another embodiment, the adjustable frame for a wheelchair may also comprise at least one ratchet arm, including a ratchet integrated with the at least one chair back tube and a lever arm having a first and a second end. The first end of the lever arm is fixed to the ratchet, and the second end of the lever arm (opposite the first end) is positioned to be moved by an occupant of the adjustable wheelchair frame. The ratchet arms are adapted for lifting the at least one chair back tube from the lower position to the higher position by a repeated movement of the occupant.

In the embodiments that include ratchet arms, the adjustable frame for a wheelchair may also comprise at least one cable and at least one pulley. In such embodiments, the cables have a retractable end secured to the ratchet and a fixed end secured to the generally vertical tubes. The pulleys are fixed to the chair back tubes at a point vertically lower than the ratchet. The cables extend downwardly from the ratchet, wrap around the pulley, and extend upwardly to the fixed end, which is secured to the generally vertical tubes at a point vertically higher than the pulleys.

As will be recognized by those of skill in the art, other arrangements may be used to accomplish a lifting movement of the at least one chair back tube with respect to the at least one generally vertical tube. In particular, a rack and pinion may be used in place of a cable and pulley, and the present invention should be understood to include such alternative embodiments of the lifting mechanism.

In an embodiment, the present invention may also comprise at least one adjustable drive lever. Adjustable drive levers include a first end pivotally mounted to the base frame and a second end opposite the first end that is capable of being gripped by an occupant in a standing position. By a lateral movement of the adjustable drive levers, the occupant may selectively contact at least one of the plurality of wheels, for example, either the left or right drive wheel, so that pivotal motion of the adjustable drive levers may cause rotation of the left or right drive wheel. Optionally, the adjustable drive levers may also include a friction pad positioned to contact the left or right drive wheel. The friction pads merely make the use of the adjustable drive levers more convenient by improving the selective contact between the adjustable drive levers and the wheels. Also optionally, the base frame portion may have a drive lever stop projecting outwardly from one or more of the generally horizontal tubes of the base frame portion. The drive lever stop prevents the drive levers from being pivotally rotated out of reach of an occupant of the adjustable frame.

In another embodiment, the present invention is directed to a manually operable standing wheelchair, which comprises a base frame portion, at least one chair back tube, at least one support linkage, a means for retracting and deploying at least one anti-tip wheel, and a means for sliding the at least one chair back tube. In such embodiments, the base frame portion, chair back tubes, and support linkages have substantially the same form as described in the foregoing. The means for sliding the at least one chair back tube from the lower position to the higher position includes the ratchet arms, cables, and pulleys described above, but also includes the equivalents of these devices, as described in the foregoing.

The means for retracting and deploying the anti-tip wheels can include a variety of different mechanisms, such as a spring connected to the base frame portion at a first end, and to an armature at a second end. The armature may be connected to a pivot shaft within a pivotal anti-tip wheel mount, and also to a first end of a retraction cable, the second end of the retraction cable being secured to the chair back tubes. The combination of spring, armature, pivotal anti-tip wheel mount, and retraction cable is useful for retracting and deploying the anti-tip wheels of the present invention. Of course, arrangements other than those described and shown in the attached drawings are also possible, many of which would be mechanically equivalent to the arrangement shown and described expressly herein in connection with the retraction and deployment of the anti-tip wheels.

Although the term "tubes" is used to refer to members of the structure of the present invention, the use of this term is not meant to imply that a particular structural member must be hollow or cylindrical in shape. As would be understood by one of ordinary skill in the art, the members of the structure of the present invention referred to as "tubes" might also be solid or rectangular, and in general, the term "tubes", as it is used in the present application, should be understood to mean "elongated members."

BRIEF DESCRIPTION OF THE DRAWINGS

The foregoing and other objects, advantages, and features of the present invention will be apparent from the following detailed description and the accompanying drawings, in which.

DETAILED DESCRIPTION OF THE INVENTION

There are some disabled people who, notwithstanding an incapacity to move their legs while walking, have an ability to support the weight of their upper body with their lower body. The manually operable standing wheelchair of the present invention is a mechanical device that allows an occupant, such as a paraplegic, to move under their own power from a sitting position to standing position. The present invention also allows for the occupant to move the wheelchair around while in the sitting position, the standing position, or in any position in between.

Figure 1:
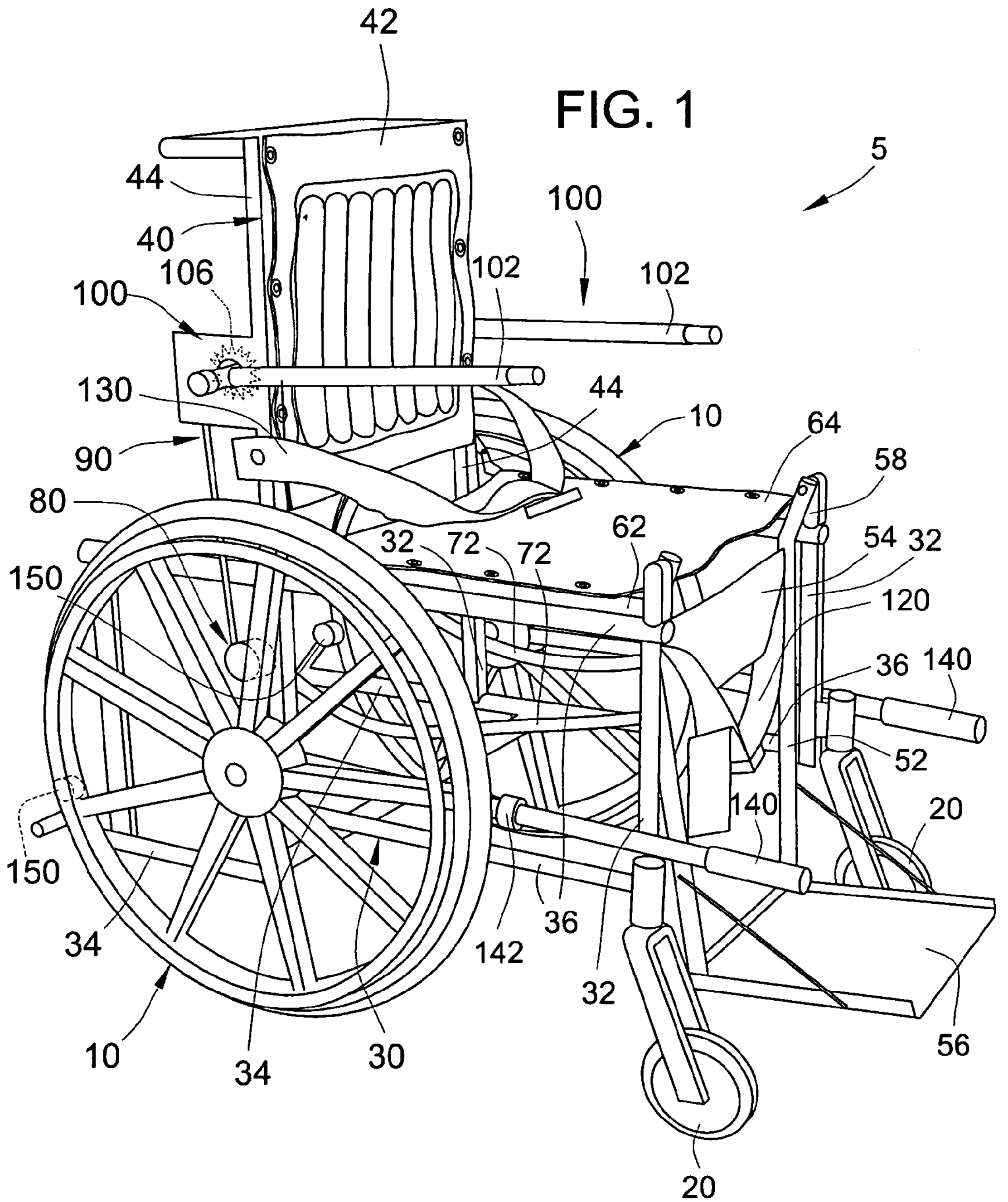
FIG. 1 is a perspective view of the manually operable standing wheelchair in a sitting position, in accordance with an embodiment of the present invention.
Figure 2:
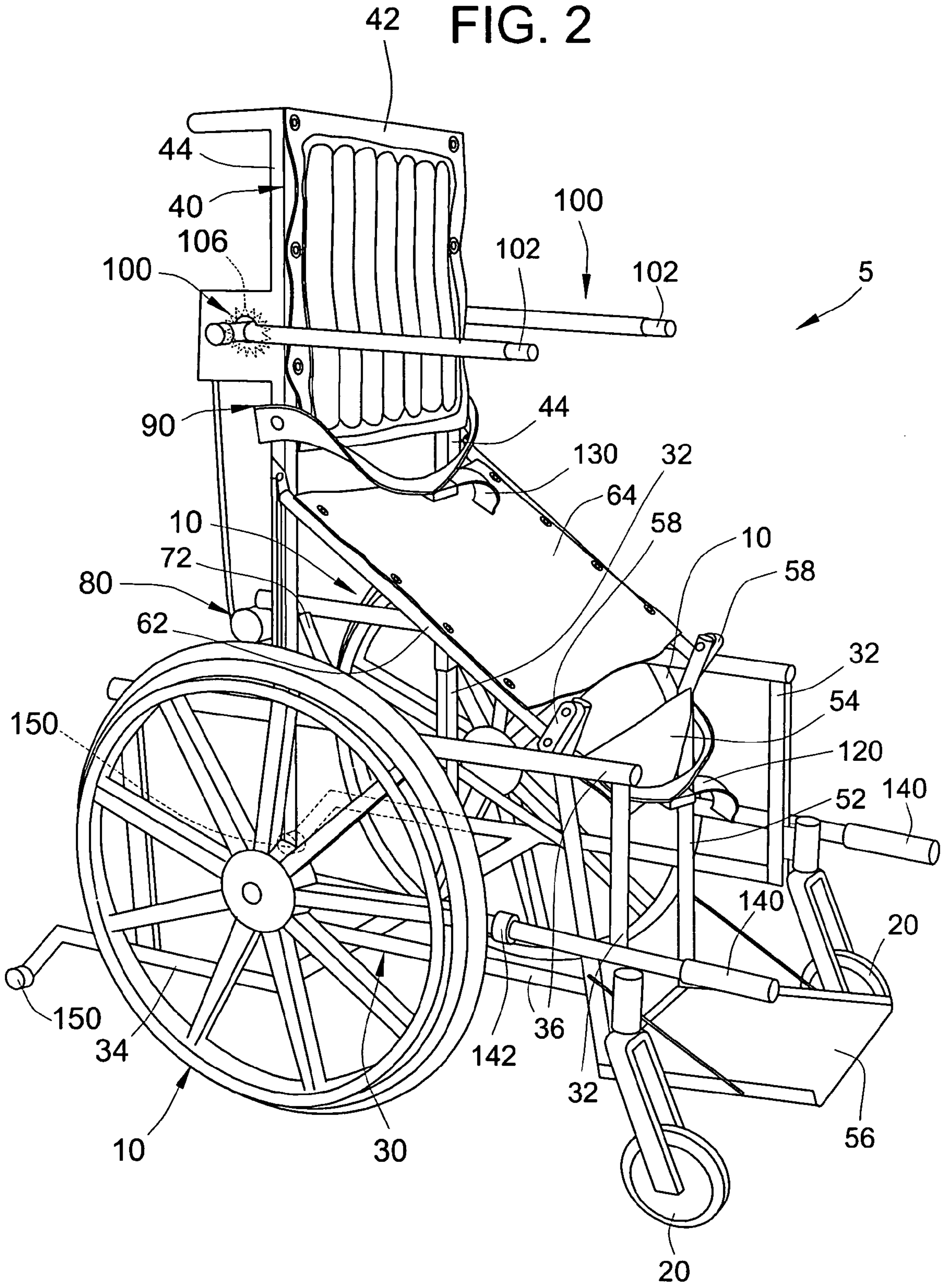
FIG. 2 is a perspective view of the manually operable standing wheelchair in an intermediate position, in accordance with an embodiment of the present invention.
Figure 3:
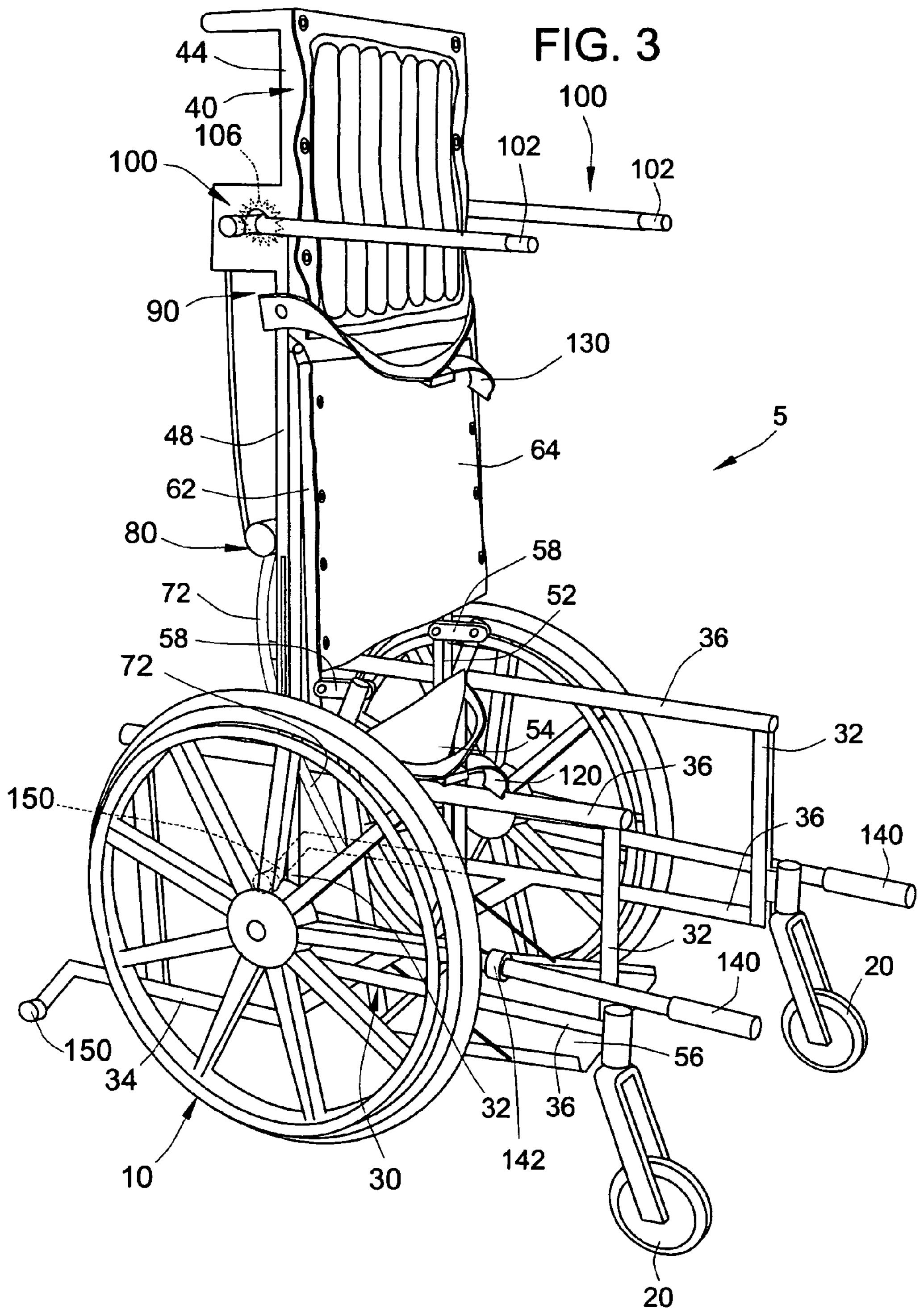
FIG. 3 is a perspective view of the manually operable standing wheelchair in a standing position, in accordance with an embodiment of the present invention.

The embodiment of the manually operable standing wheelchair labeled 5 in the drawings includes a base frame portion 30, chair back portion 40, support linkage system including seat support linkages 62 and leg support linkages 72, and a plurality of wheels. The base frame portion 30 has vertical tubes 32, horizontal tubes 36, and a pivotal mount 34 for an anti-tip wheel 150. In order to accommodate an occupant, a seat back 42 is mounted to chair back tubes 44, and a seat bottom 64 is mounted to the seat support linkages 62. The plurality of wheels of the present invention include left and right drive wheels 10, a pair of front wheels 20, and anti-tip wheels 150. As illustrated in FIGS. 1–3, the wheelchair 5 also includes a waist restraint 130 and a knee restraint 120 to support the occupant.

In addition, the adjustable frame for a wheelchair of the present invention may also include the pair of adjustable drive levers 140 with friction pads 142. A pair of left and right ratchet arms 100, which allow for the frame to be adjusted from a sitting position to a standing position, are shown in FIG. 1. The left and right ratchet arms each have a lever arm 102 and a ratchet 106. The ratchet 106 has a ratchet spool (hidden in FIG. 1), and a cable 90. The cable 90 wraps around the ratchet spool when retracted by a movement of the lever arms 102 in coordination with the ratchet 100. The cable 90 also wraps around the pulley 80 (partially hidden from view) and is fixed to the vertical tubes 32, which, in the sitting position, are telescoped inside the chair back tubes 44 of the chair back portion 40. The knob shown at the end of the lever arm 102 is effective for reversing the ratchet action of the ratchet 106, in order to allow the occupant to shift the adjustable frame from the standing position to the sitting position.

The adjustable frame comprises a plurality of inter-connected mechanical supports including the base frame portion 30 with vertical tubes 32, horizontal tubes 36, and pivotal mounts for the anti-tip wheels 34, to which a spring loaded mechanism is attached (see FIGS. 7A–7B and description below). The chair back portion 40 of the adjustable frame includes seat back 42 and chair back tubes 44. The leg rest portion 50 includes a pair of leg rest tubes 52, a cross bar 54, and a foot rest 56. The cross bar 54 connects the left leg tube 52 to the right leg rest tube 52, and stabilizes the leg rest tubes 52 with respect to one another. The foot rest 56 is fixed to an end of the leg rest portion 50 vertically below the linkage 58.

The support linkages system provides mechanical support for the weight of the occupant, and stabilize the movable portions of the adjustable frame. The support linkage system includes a pair of left and right seat support linkages 62 (providing mechanical support for the weight of the occupant) and a pair of left and right leg support linkages 72 (stabilizing the leg rest position with respect to the seat support linkages 62). The pair of left and right leg support linkages 72 are shown beneath the seat bottom 64 in FIG. 1. In the embodiment shown in FIG. 1, the leg support linkages 72 are a curved set of tubes, although they may be curved in another direction or not at all in other embodiments of the present invention. The leg support linkages 72 are hingedly connected to the chair back tubes 44 at a first end, and to the leg rest tubes 52 at a second end opposite the first end.

Advantageously, the seat support linkages 62 are always (in any position of the adjustable frame, i.e., either in the sitting position, the standing position, or in between) in slidable contact with horizontal tubes 36 at the hinged connection 58. The force of the weight of the occupant of the adjustable frame is thus transmitted at the hinged connection 58 from the seat support linkages 62 to the horizontal tubes 36 of the base frame portion, and thus on to the plurality of wheels and the ground beneath them.

Figure 4:
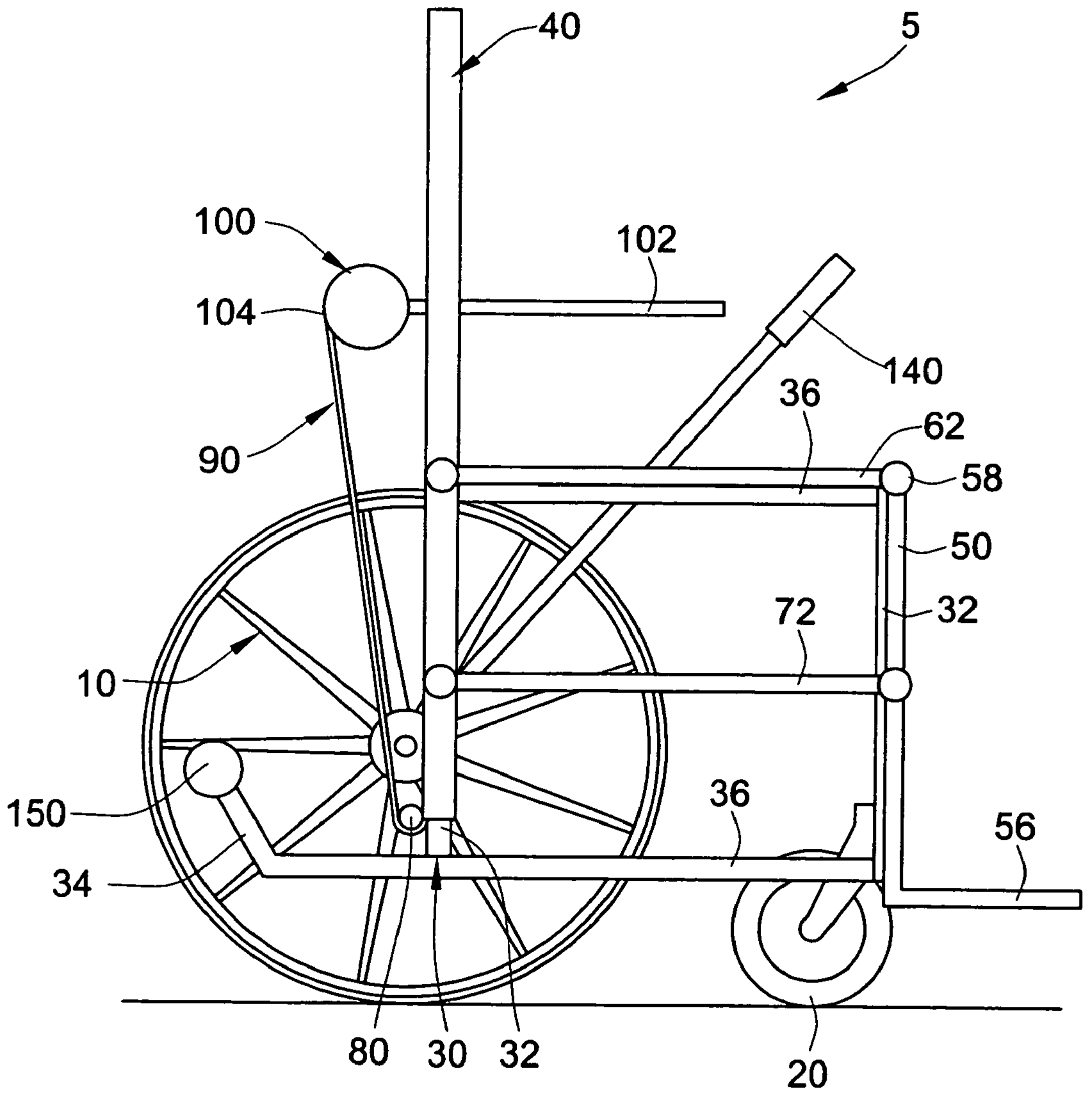
FIG. 4 is a sectional side elevation view of the manually operable standing wheelchair in a sitting position, in accordance with an embodiment of the present invention.
Figure 6:
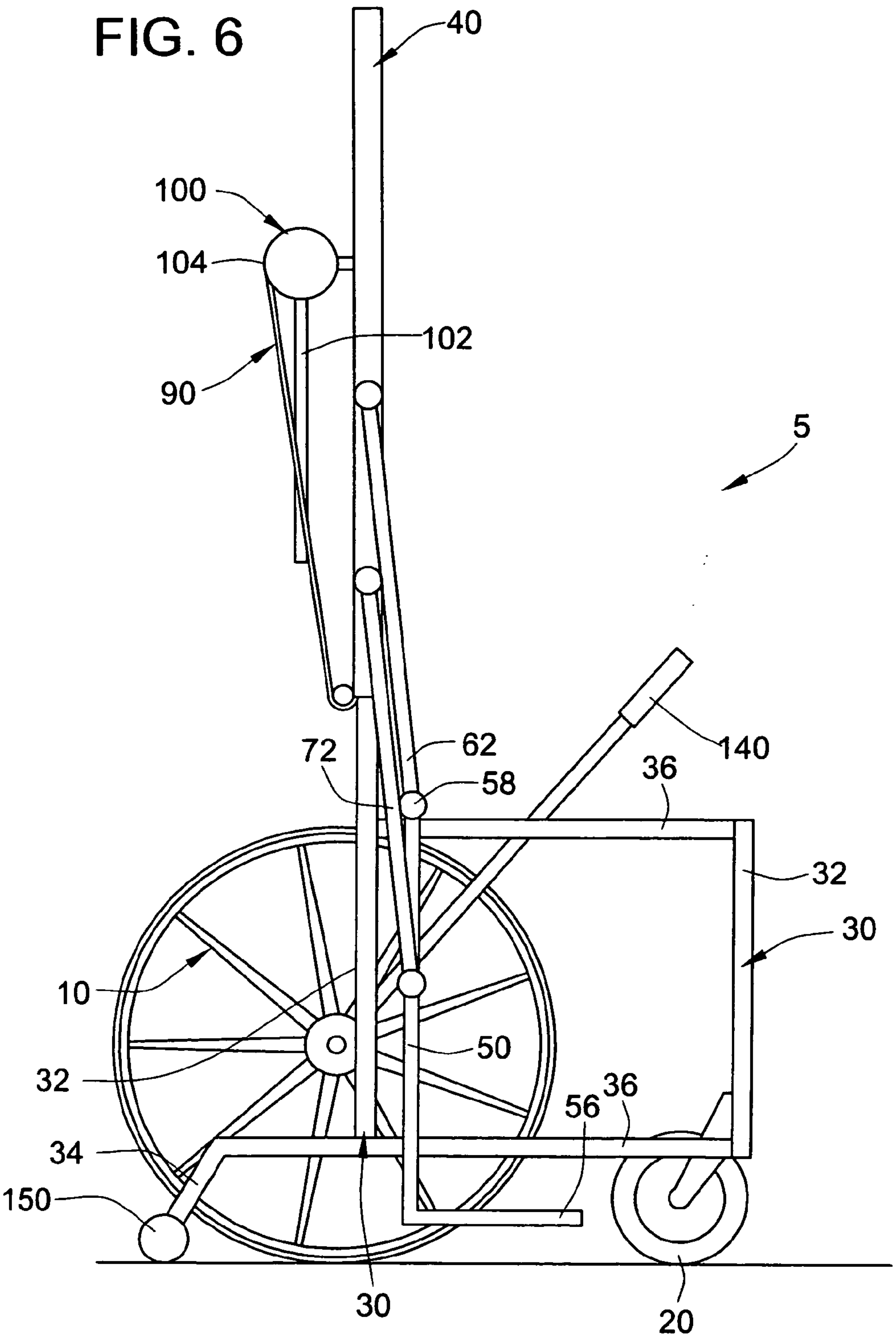
FIG. 6 is a sectional side elevation view of the manually operable standing wheelchair in a standing position, in accordance with an embodiment of the present invention.

In an embodiment, the leg support linkages 72 allow the leg rest portion 50 to be shifted backwardly as the support linkages 62 are shifted from a generally horizontal orientation (when the chair back portion 40 is in the sitting position, as in FIGS. 1 and 4) to a generally vertical position (when the chair back portion 40 is in the standing position, as in FIGS. 3 and 6).

By repeatedly pressing downwardly and then lifting upwardly on the left and right lever arms 102, which are part of the ratchet arms 100, an occupant of the manually operable standing wheelchair 5 raises himself or herself to an intermediate position as is shown, in an embodiment, in FIG. 2. The pair of left and right chair back tubes 44, which are part of the chair back portion 40 have shifted upwardly in FIG. 2. The upward movement of the chair back tubes 44 has lifted the pair of seat support linkages 62, which are hingedly connected to the chair back portion 40 at a hinge connection shown just below the waist restraint 130. The leg support linkages 72 have also shifted upwardly at their first end, pulling the leg rest portion 50 backwardly.

An occupant of the wheelchair in the intermediate position, as shown in perspective view in FIG. 2, is in a position between a sitting position and a standing position. Advantageously, the occupant of the wheelchair, as shown in the embodiment of FIG. 2, is able to move about under his or her own power in the intermediate position. The pair of left and right adjustable drive levers 140 are designed to selectively contact the drive wheels 10, allowing the occupant of the manually operable standing wheelchair to, with a rowing movement, move himself or herself about while in the intermediate position. Friction pads 142 and optional drive lever stops (not shown) mounted to the upper horizontal tubes 36 of the base frame portion 30 can be used with the adjustable drive levers 140 in order to make moving more convenient for the occupant. The friction pads 142 prevent slipping of the adjustable drive levers 140 as they selectively contact a respective wheel, while the drive lever stops prevent the drive levers from moving out of reach from the occupant in a particular direction of pivotal movement. For example, the drive lever stops might be used to prevent the adjustable drive levers 140 from swinging back to a pivotal position behind the occupant, and out of reach. The drive lever stops are made, in an embodiment, from a solid metal block fixed to the upper horizontal tubes 36 in a position that obstructs the pivotal movement of the drive levers 140. Of course, a hollow block or a wood block might be used for the same purpose, and all that is necessary is structural stability enough to prevent the pivotal movement of the drive levers 140.

Should the occupant continue to repeatedly press downwardly and lift upwardly on the lever arms 102, which are part of the ratchet arms 100, the adjustable frame of the wheelchair will eventually be shifted into the standing position shown, in an embodiment, in the perspective view of FIG. 3. In FIG. 3 the seat bottom 64 is generally vertical. The seat bottom 64 is hingedly connected to the chair back tubes 44 at the vertically higher end of the seat bottom 64, and lays flat against the chair back tubes 44 under the force of gravity. The leg rest portion 50, has shifted backwardly so that the foot rest 56 is now generally vertically below the lever arms 102. The occupant of the manually operable standing wheelchair, in the standing position in FIG. 3, is also capable of moving under his or her own power using the pair of left and right adjustable drive levers 140 when in the standing position. The seat support linkages 62 are, as described above, slidably contacting the upper horizontal tubes 36 of the base frame portion 30 at the hinged connection 58.

The occupant may move in the standing position using the adjustable drive levers 140. The adjustable drive levers 140 are pivotally connected to the wheel axle. At a second end opposite the first end, they may be extended into a position within the grasp of an occupant of the wheelchair. The adjustable drive levers 140 may be adjusted for use in the sitting position, an intermediate position, or the standing position. By repeatedly selectively contacting the friction pads 142 of the lever drive arms 140 to the drive wheels 10 the occupant may, with a rowing motion, move the wheelchair about.

Figure 5:
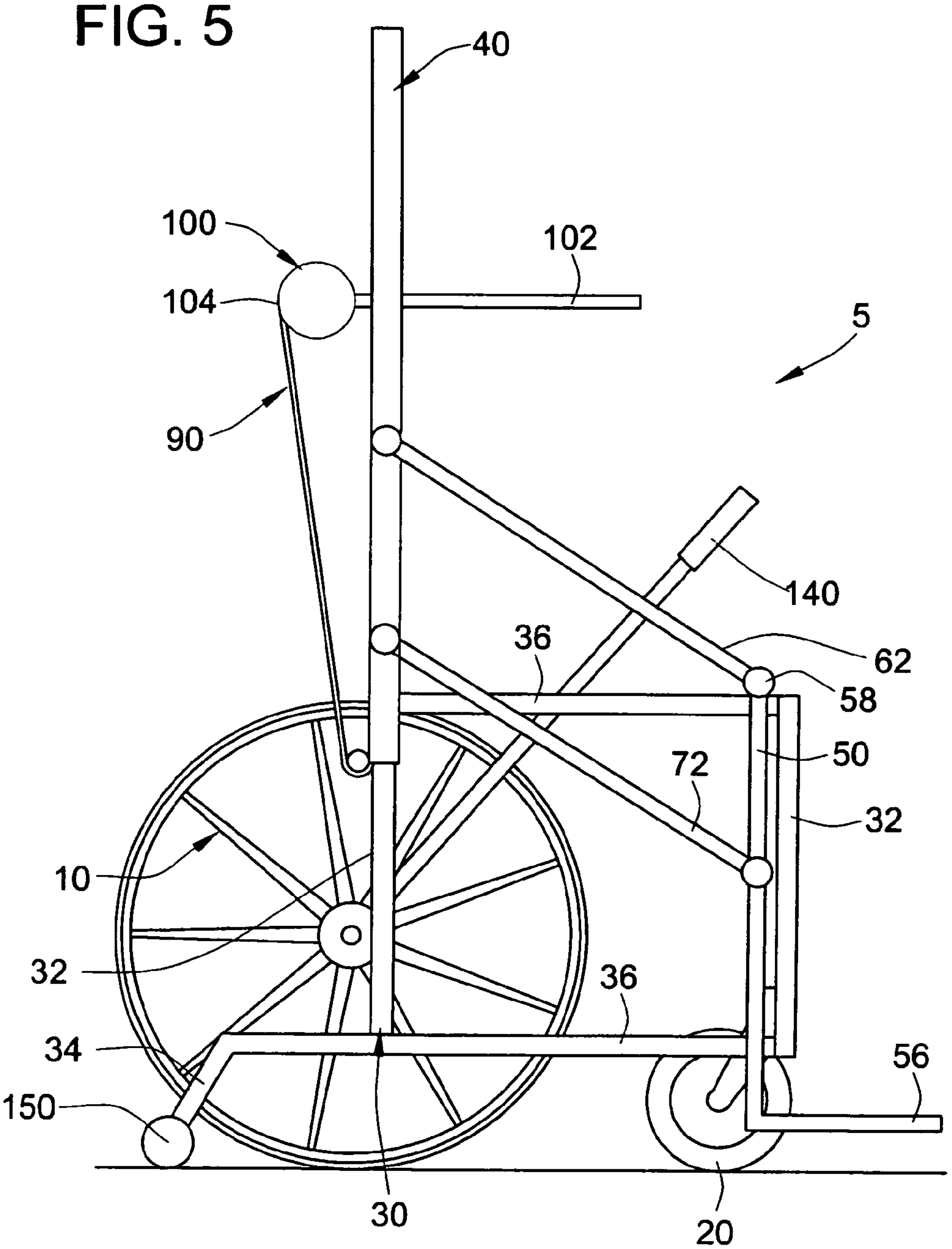
FIG. 5 is a sectional side elevation view of the manually operable standing wheelchair in an intermediate position, in accordance with an embodiment of the present invention.

In one embodiment of the present invention, the wheelchair 5 is shown in side elevation in FIGS. 4–6. The side elevation views of FIGS. 4–6 show the adjustable frame for the wheelchair partially dismantled, with the half of the adjustable frame closest to the viewer substantially removed for ease of explanation. (FIGS. 4–6 are effectively a cross-section of the adjustable frame).

The side elevation view of FIG. 4 shows another embodiment of the present invention in a sitting position. Shown is a drive wheel 10, a front wheel 20, a base frame portion 30, a chair back portion 40, a leg rest portion 50, a leg support linkage 72, a seat support linkage 62, a pulley 80, a cable 90, and a ratchet arm 100, including a ratchet spool 104 and a lever arm 102. More visible in FIG. 4 than in the preceding FIGS. 1–3 is the anti-tip wheel 150. Hinged connections between the leg rest portion 50, the leg support linkages 72, the seat support linkages 62, and the chair back portion 40 are shown as circles. The link 58 shows the point of slidable contact between the seat support linkage 62 and horizontal tubes 36 of the base frame portion 30. An adjustable drive lever 140 is also shown in a slightly different position than the position shown therefor in FIGS. 1–3.

FIG. 5 shows a side elevation view of an embodiment of the present invention in an intermediate position between the sitting position and the standing position. From FIG. 5 it is clear that the chair back portion 40 has shifted vertically upward relative to the base frame portion 30, shifting upwardly the first end of the seat support linkages 62 and the leg support linkages 72, which are both hingedly connected to the chair back portion 40. In addition, the leg rest portion 50 has shifted backwardly from the position it was in in the sitting position, along with the ends of the seat support linkages 62 and the leg support linkages 72 to which it is hingedly connected. The seat support linkage 62 still rests in slidable contact with the upper horizontal tube 36 at the link 58.

Another embodiment of the present invention in the standing position is shown in side elevation in FIG. 6. As described above (in connection with FIG. 3), the seat support linkages 62 and the leg support linkages 72 now lay almost flat against the chair back portion 40 and the vertical tubes 32 of the base frame portion 30. In the embodiment of the invention shown in FIG. 6 the lever arms 102 have been rotated back and out of the way of the occupant of the manually operable standing wheelchair. If the lever arms 102 are deployed in their typical position, as shown in FIG. 3, then they would be vertically above the foot rest 56. Lastly, the adjustable drive lever 140 shown in FIG. 6 is only partially extended. The lever arm 140 might be fully extended to allow the occupant of the manually operable standing wheelchair in the standing position to move the present invention about under their own power by repeatedly selectively pressing the adjustable drive levers 140 against their respective drive wheels 10. The anti-tip wheel 150 is also shown extended in FIG. 6 improving the balance of the wheelchair while in the standing position by extending its base.

Ratchet spool 104, cables 90, and pulleys 80 are used to adjust the frame in accordance with the present invention. In an embodiment, the left and right sides of the adjustable frame both have ratchet arms 100, cables 90, and pulleys 80. The vertical tubes 32 of the base frame portion 30 are telescoped inside the chair back tubes 42, which are slightly larger in width than the vertical tubes 32. The cable 90 has a fixed end attached to the base portion tubes 32, and a retractable end secured to the ratchet spool 104. When the ratchet is rotated in one direction with the lever arms 102, the cable 90 is retracted, lifting the pulley 80, and the chair back tube 42 to which the pulley is fixed. The retraction of the cable 90 thereby allows for the chair back portion 40 to be vertically lifted relative to the base frame portion 30.

Figure 7A:
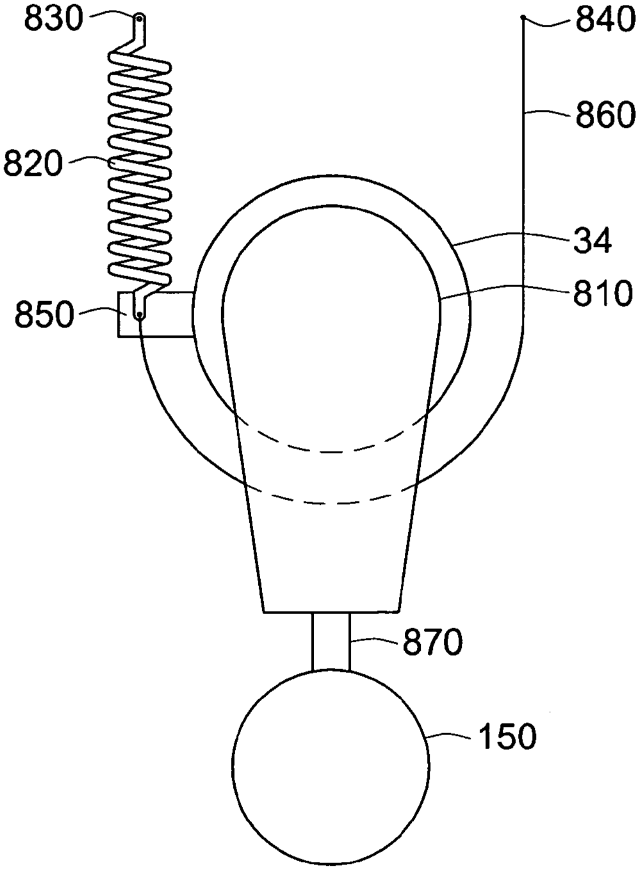
FIGS. 7A–7B are a cross section of a part of the base frame portion that includes the pivotal mount for an anti-tip wheel in a retracted and a deployed position, in accordance with an embodiment of the present invention.
Figure 7B:
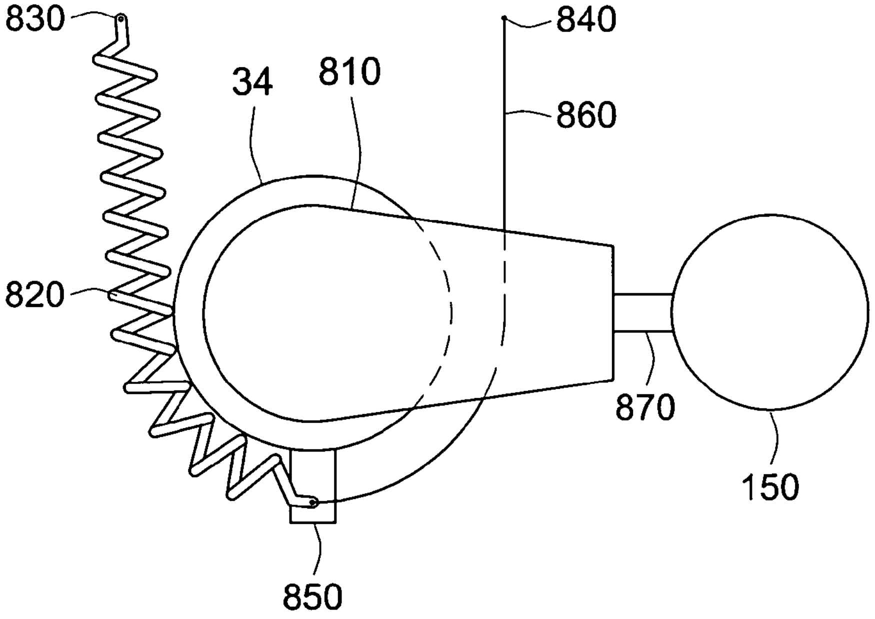

An embodiment of the retraction and deployment mechanism for the anti-tip wheels is shown in FIGS. 7A–B. The anti-tip wheel is shown in a deployed position in FIG. 7A. The pivotal mount 34 for an anti-tip wheel 150 is shown, along with a spring 820, armature 850 for the arm 810, retraction cable 860, and wheel mount 870. In the deployed position, the end 840 of the retraction cable 860 is closer to the anti-tip wheel 150, so that the spring 820, has pulled the anti-tip wheel 150 into a deployed position. Both the spring 820 and the retraction cable 860 are fixed to the armature 850 of the arm 810 to which the anti-tip wheel 150 is rotatably mounted at the wheel mount 870.

When the retraction cable 860 is retracted (i.e., when the wheelchair moves from the standing position to the sitting position), the retraction cable 860 pulls the armature 850, and the anti-tip wheel 150 along with it into a retracted position shown in FIG. 7B, against the force of the spring 820, which is fixed at an end 830 to the base frame portion 30 of the adjustable frame.

The means for retracting and deploying can include a variety of different mechanisms, such as a spring connected to the base frame portion at a first end, and to an armature at a second end. The armature is connected to a pivotal anti-tip wheel mount, and also to a first end of a retraction cable, the second end of the retraction cable being secured to the chair back tubes. The combination of spring, armature, pivotal anti-tip wheel mount, and retraction cable is useful for retracting and deploying the anti-tip wheels of the present invention. Of course, arrangements other than those described and shown in the attached drawings are also possible, many of which would be mechanically equivalent to the arrangement shown and described explicitly herein.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wheelchair comprising:

a chair back portion that provides back support to an occupant of the wheelchair;

a ratchet coupled to the chair back portion, wherein when the occupant actuates the ratchet, the chair back portion is moved to a raised position, thereby permitting the occupant to assume a standing position within the wheelchair;

a pulley attached to the chair back portion;

a cable attached to the ratchet at one end and wrapped around the pulley at the other end;

a first wheel and a second wheel disposed on opposite sides of the chair back portion and oriented so that they each make contact with the ground; and a drive lever coupled to the first wheel such that when the occupant actuates the drive lever, the first wheel rotates, thereby propelling the wheelchair, wherein the first drive lever is oriented so as to be accessible by the occupant when the chair back portion is in the raised position and the occupant is in the standing position.

2. The wheelchair of claim 1, wherein the chair back portion includes a plurality of elongated members, the wheelchair further comprising:

an adjustable frame comprising a base portion, wherein the first and second wheels are attached to the base portion, wherein the base portion includes a means for lifting the plurality of elongated members with respect to the base portion.

3. The wheelchair of claim 2, wherein the lifting means comprises a second plurality of elongated members telescopingly engaged to the plurality of elongated members of the chair back portion.

4. The wheelchair of claim 2, wherein the lifting means comprises a selectively engaged rail.

5. The wheelchair of claim 2, wherein the lifting means comprises a selectively engaged track.

6. The wheelchair of claim 1, wherein the drive lever is mounted so that it pivots about the first wheel, and wherein the drive lever comprises a friction pad that makes contact with the first wheel.

7. The wheelchair of claim 1, further comprising a rack and pinion assembly coupled to the chair back portion and engaged by the ratchet.

8. The wheelchair of claim 1, further comprising a support linkage hingeably connected to the chair back portion, wherein the support linkage moves from a generally horizontal position to a generally vertical position when the chair back portion is moved to a raised position.

9. A wheelchair comprising:

a base frame portion having a first side and a second side, the first and second sides being oriented opposite one another;

a first drive wheel rotatably coupled to the first side of the base frame portion;

a second drive wheel rotatably coupled to the second side of the base frame portion;

a chair back portion coupled to the base frame portion;

a drive lever coupled to the first drive wheel;

a ratchet mechanism coupled to the chair back portion;

a pulley attached to the chair back portion;

a cable attached to the ratchet mechanism at one end and wrapped around the pulley at the other end;

wherein the wheelchair has a plurality of positions, including:

a first position, in which a seat is deployed to allow an occupant of the wheelchair to sit down in the wheelchair, and a second position, in which the seat is stowed, and the chair back portion is raised so as to allow the occupant to stand up in the wheelchair;

the ratchet mechanism being operable to change the wheelchair from the first position to the second position; and wherein the drive lever is reachable by the occupant when the wheelchair is in the second position and the occupant is in the standing position, wherein when the occupant actuates the drive lever, the first drive wheel rotates thereby causing the wheelchair to move.

10. The wheelchair of claim 9, wherein the chair back portion includes a first plurality of elongated members and the base portion includes a second plurality of elongated members, and wherein the first plurality of elongated members are telescopingly engaged to second plurality of elongated members.

11. The wheelchair of claim 9, further comprising a selectively engaged rail to guide the chair back portion as the wheelchair changes from the first position to the second position.

12. The wheelchair of claim 9, further comprising a selectively engaged track to guide the chair back portion as the wheelchair changes from the first position to the second position.

13. The wheelchair of claim 9, wherein the drive lever is mounted so that it pivots about the first drive wheel, and wherein the drive lever comprises a friction pad that makes contact with the first drive wheel.

14. The wheelchair of claim 9, further comprising a rack and pinion assembly coupled to the chair back portion and engaged by the ratchet mechanism.

* * * * *

UNITED STATES PATENT AND TRADEMARK OFFICE

CERTIFICATE OF CORRECTION

PATENT NO. : 7,165,778 B2
APPLICATION NO. : 11/267989
DATED : January 23, 2007
INVENTOR(S) : Todd A. Kuiken It is certified that error appears in the above-identified patent and that said Letters Patent is hereby corrected as shown below:

Column 3, line 13, "tuning" should read --turning--.

Column 7, line 42, "linkages" should read --linkage--.

Signed and Sealed this

Twenty-ninth Day of May, 2007

JON W. DUDAS
*Director of the United States Patent and Trademark Office*